Aug. 10, 1965
W. E. PFEFFER
3,200,332
D.C. METER WITH PERMANENT MAGNET ROTOR AND
UNITARY TERMINAL AND FIELD CONDUCTOR MEANS
Filed Aug. 6, 1962
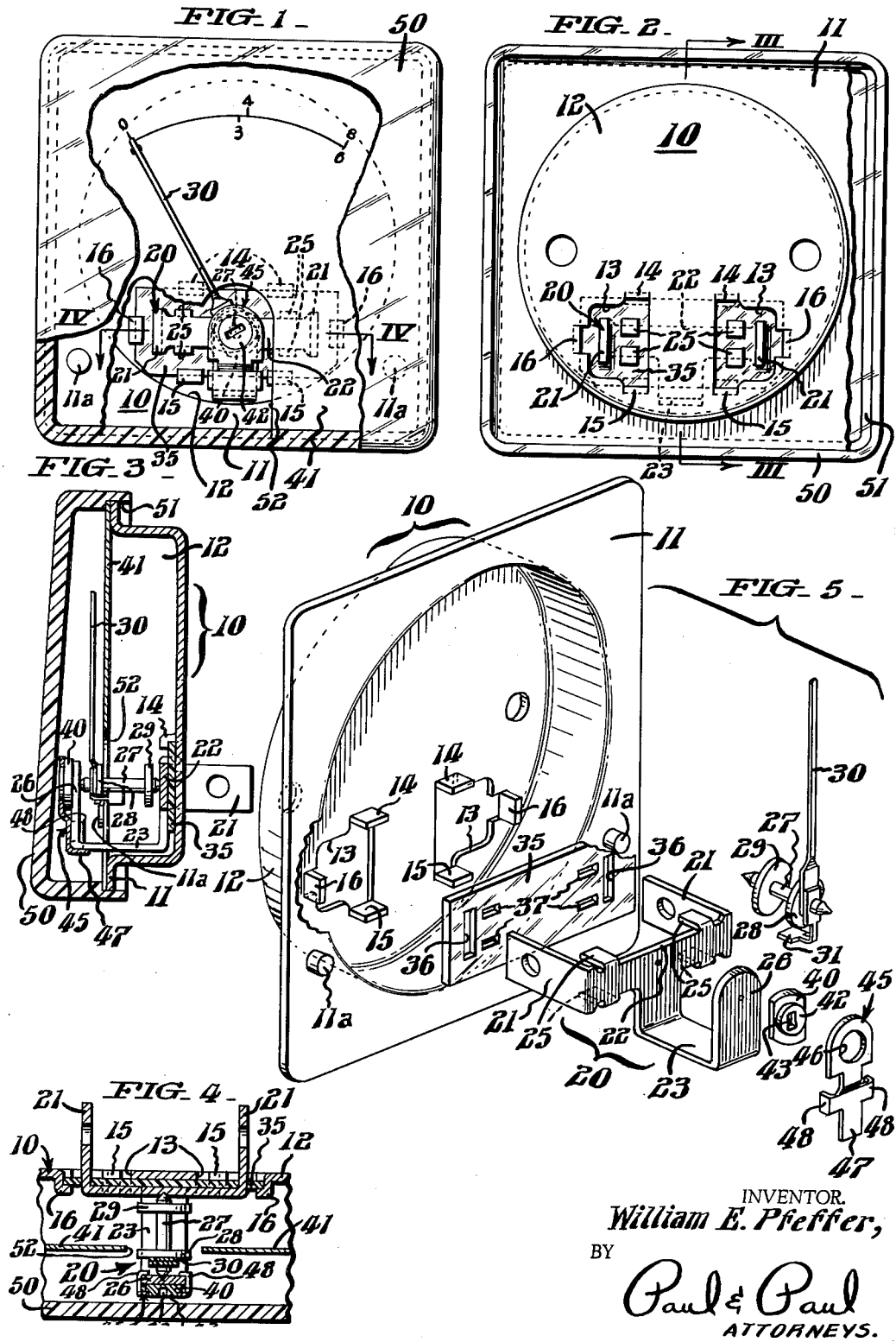
INVENTOR.
William E. Pfeffer,
BY
Paul & Paul
ATTORNEYS.

United States Patent Office 3,200,332
Patented Aug. 10, 1965

3,200,332
D.C. METER WITH PERMANENT MAGNET ROTOR AND UNITARY TERMINAL AND FIELD CONDUCTOR MEANS
William E. Pfeffer, Perkasie, Pa., assignor to Lester R. Void, Paul W. Mood, and William E. Pfeffer, copartners, trading under the name of Electro-Mechanical Instrument Co., Perkasie, Pa.
Filed Aug. 6, 1962, Ser. No. 214,981
7 Claims. (Cl. 324—146)

This invention relates to an electric meter.

My invention has, for its main object, the provision of an electric meter which is compact; which is composed of a minimum number of parts susceptible of fabrication from inexpensive materials; which is easily and quickly assembled at small cost from the standpoint of labor; and which, withal, is dependable for the accuracy of its readings.

Other objects and attendant advantages will appear from the following detailed description of the attached drawings; wherein:

FIG. 1 shows the meter in front elevation with portions of its casing cover broken out and partly shown in section to expose the parts at the interior;

FIG. 2 shows the rear elevation of the meter;

FIG. 3 is a cross-section taken as indicated by the angled arrows III—III in FIG. 2;

FIG. 4 is a fragmentary detail section taken as indicated by the angled arrows IV—IV in FIG. 1; and FIG. 5 is an exploded view in perspective of the casing and the movement parts of the meter showing them juxtaposed in relation in readiness to be assembled.

As herein exemplified, the electric meter of my invention has a casing 10 which, in practice, may be fashioned from sheet metal with a rectangularly-profiled flange 11 surrounding a depressed circular cup-like hollow 12. Punched out of the back of the casing 10 below the center and equally spaced respectively from the medial vertical plane through the casing as best seen in FIG. 5, are substantially square symmetrically-arranged openings 13 with narrow punched out lugs 14 and 15 projecting inwardly from their top and bottom edges adjacent their inner corners, and with narrow punched out lugs 16 projecting inwardly from the centers of their relatively remote side edges.

The movement of the meter includes a member 20 which, as best shown in FIG. 5, is fashioned, in practice, from a profiled blank of non-ferrous electrically conductive metal such as brass or copper, for example, said member having terminal legs 21 extending rearwardly from the opposite ends of a transverse portion 22, and a U-shaped bracket portion 23 which extends forwardly from said transverse portion at the center. For a purpose later on explained, the transverse portion 22 of the member 20 is provided at uniform distances from its center with lugs 25 which are bent rearwardly from its top and bottom edges. Adapted to be rotatively supported between the transverse portion 22 of the member 20 and the upright arm 26 of the bracket portion 23 is an arbor 27 having affixed thereto, in spaced relation, a pair of polarized magnet discs 28, 29 and above the disc 28 a pointer hand 30 which latter is counterbalanced as at 31. A flat elongate rectangular base strip 35 of insulation is provided respectively adjacent its opopsite ends as shown in FIG. 5, with vertical slits 36 which are spaced to correspond with the spacing of the legs 21 of the element 20, and somewhat inward of each such slit with pairs of horizontal slits 37 which are vertically spaced to correspond with thet spacing of the lugs 25 of said member. The movement of the meter further comprises an element in the form of a small bar magnet 40 which has a cylindrical boss or hub 42 projecting from one side thereof at the center, said hub having a diametral slot 43 therein to fit a zero-adjuster button if desired; and a keeper piece 45 stamped, in practice, from brass or copper, said strip having a head portion with an aperture 46 of a diameter to receive the hub 42 of the bar magnet 40, and a pendent portion 47 with lateral tabs 48.

In accordance with my invention, the several parts constituting the movement of the meter are preassembled into a self-contained unit, the procedure being as follows: The legs 21 and the lugs 25 of the member 20 are thrust respectively through the vertical and horizontal slots 36 and 37 of the insulated backing strip 35 after which said lugs are bent inwardly over the top and bottom edges of said strip. The hub 42 of the bar magnet 40 is inserted into the opening 46 of the keeper piece 45 and applied to the outer face of the upright arm 26 of the member 20, wherupon the lugs 48 on the pendent portion 47 of the keeper piece are bent over to embrace the arm 26 as best seen in FIG. 4. With the foregoing accomplished, the arbor 27 and its appendages comprising an arbor-assembly are applied to the member 20 by engaging the pointed ends of the arbor into spot indentations respectively at the center of the transverse portion of said member and in the arm 26, which indentations comprise bearing means for the arbor-assembly. It is to be particularly noted that in the assemblage the bar magnet 40 is supported with the axis of its hub in line with the axis of the arbor 27.

With the movement pre-assembled as above explained, it is inserted into the hollow of the casing 10, the legs 21 of the member 20 being thrust incidentally through the openings 13 in the back of the casing 10 and the backing strip 35 engaged in the space bounded by the lugs 14, 15 and 16 on the back wall of the casing, said lugs being finally bent inwardly to overlap the top and bottom edges of said strip. It is to be observed from FIGS. 3 and 4 that with the movement unit placed and made fast, end portions of the legs 21 of the member 20 protrude at the back of the casing to serve as terminal prongs.

A square transparent cover of plastic or the like has a narrow perimetric wall which is recessed as at 51 to fit, with interposition of a graduated dial chart 41, snugly over the flange 11 of the casing 10 as in FIG. 3, said chart being definitely positioned by engagement of apertures in the lower corners thereof with correspondingly spaced projecting studs 11a on the casing flange, and being cut away centrally of its bottom edge as at 52 (in FIG. 1) to clear the arm 26 of the member 20 of the movement unit.

Operation

Normally, by reaction between the bar magnet 40 and the magnet disc 28 on the arbor 27, the pointer hand 30 is maintained at zero on the dial 41. As will be readily understood the bar magnet 40 can be adjusted rotatively when necessary by inserting a screwdriver into the slot 43 of its boss 42 upon removal of the casing cover 50 in order to accurately determine the zero position of the pointer hand 30. When electric current flows between terminal portions 21 and through the transverse portion 22 interconnecting them, the flux created about that transverse portion in its reaction upon the magnet disc 29 on the arbor 27 produces a torque which causes the pointer hand 30 to move across the dial 41 to indicate the amperage of the passing current. The transverse portion 22 may be considered a quarter-turn coil and so carries all of the current flowing between terminals 21, 21, no other current path being traceable through the remaining parts of the meter.

While in accordance with the provisions of the statutes, I have illustrated and described the best forms of embodiment of my invention now known to me, it will be apparent to those skilled in the art that changes may be made in the form of the meter described without departing from the spirit and scope of the invention as set forth in the appended claims, and that in some cases certain features of my invention may be used to advantage without a corresponding use of other features.

Having thus described my invention, I claim:

1. An electric meter comprising:
   a hollow cup-like casing with spaced openings in the bottom wall thereof,
   a unitary stator member fashioned from a profiled blank of electrically conductive non-ferrous metal, said stator having
      (a) a transverse portion within said casing forming one-fourth of a turn of a coil disposed in proximity to said bottom wall of said casing,
      (b) two terminal portions integral with and supported solely from said transverse portion and extending downwardly of said casing through said spaced openings from the opposite end portions of said transverse portion,
      (c) a resilient U-shaped bracket portion integral with and supported solely from said transverse portion extending directly away from said wall and having an arm spaced from said transverse portion to provide between said transverse portion and said arm an arbor-receiving space,
   bearing means, one in said arm and one in said transverse portion,
   an arbor-assembly rotatably supported by and between said bearing means, said arbor-assembly including a permanent magnet disc disposed adjacent said transverse portion for developing a torque on said arbor-assembly upon flow of current through said transverse portion, and a pointer hand-mounted on said arbor-assembly, and
   means for securing to and supporting within said casing said stator member with said transverse portion in proximity to said bottom wall of said casing.

2. The electric meter of claim 1 including an insulating member, said stator member including lugs extending from said transverse portion for securing said insulating member to said transverse portion preparatory to mounting of said stator member within said casing.

3. The electric meter of claim 1 in which said arbor-assembly includes
   a zero-adjusting permanent magnet disc adjacent the spaced arm of said bracket,
   a biasing magnet, and
   means for rotatably supporting said biasing magnet from said spaced arm of said bracket.

4. The electric meter of claim 1 further including
   an insulating member which lies flat against the inner surface of said bottom wall, and
   means for holding said insulating member in a stationary position within said casing and for securing said transverse portion to said insulating member.

5. The electric meter of claim 1 including an insulating member provided with openings spaced one from the other and through which the said terminal portions extend, and lugs extending from said transverse portion bent into clamping relation with said insulating member.

6. The electric meter of claim 5 in which said bottom wall of said casing is provided with a series of upwardly extending lugs for receiving in the space between them said insulating member, said upwardly extending lugs being bent around and into a clamping engagement with said insulating member, and in which said bottom wall is provided with openings respectively larger than the space occupied by a terminal portion and associated clamping lugs.

7. The electric meter of claim 6 in which two of said upwardly extending lugs are disposed at the opposite end portions of said insulating member and two additional pairs of said upwardly extending lugs are disposed in clamping engagement with opposite side portions of said insulating member.

References Cited by the Examiner
UNITED STATES PATENTS

| 1,682,252 | 8/28 | Rodanet | 324—146 |
| 2,867,768 | 1/59 | Fribance | 324—146 |
| 2,954,526 | 9/60 | Pfeffer | 324—146 |
| 3,013,210 | 12/61 | Wargo | 324—146 |

WALTER L. CARLSON, *Primary Examiner.*